(12) United States Patent
Maertens (10) Patent No.: US 7,089,117 B2
(45) Date of Patent: Aug. 8, 2006

(54) METHOD OF ESTIMATING CROP YIELDS

(75) Inventor: Koen Maertens, Ghent (BE)

(73) Assignee: CNH America LLC, New Holland, PA (US)

( * ) Notice: Subject to any disclaimer, the term of this patent is extended or adjusted under 35 U.S.C. 154(b) by 207 days.

(21) Appl. No.: 10/476,328

(22) PCT Filed: Nov. 22, 2001

(86) PCT No.: PCT/EP01/13688

§ 371 (c)(1),
(2), (4) Date: May 5, 2004

(87) PCT Pub. No.: WO02/41687

PCT Pub. Date: May 30, 2002

(65) Prior Publication Data

US 2004/0194442 A1 Oct. 7, 2004

(30) Foreign Application Priority Data

Nov. 24, 2000 (GB) ................................ 0028665.8

(51) Int. Cl.
*G06Q 99/00* (2006.01)
(52) U.S. Cl. ........................................................ 702/5
(58) Field of Classification Search .................... 702/2, 702/5; 701/50
See application file for complete search history.

(56) References Cited

U.S. PATENT DOCUMENTS

| 5,282,389 A | | 2/1994 | Faivre et al. |
| 5,343,761 A | * | 9/1994 | Myers ....................... 73/861.73 |
| 5,771,169 A | * | 6/1998 | Wendte .......................... 702/5 |
| 5,878,371 A | * | 3/1999 | Hale et al. ...................... 702/5 |
| 6,016,713 A | * | 1/2000 | Hale ......................... 73/864.45 |
| 6,150,617 A | * | 11/2000 | Hart et al. ................ 177/25.13 |
| 6,185,990 B1 | * | 2/2001 | Missotten et al. .............. 73/73 |
| 6,313,414 B1 | * | 11/2001 | Campbell ..................... 177/16 |
| 6,508,049 B1 | * | 1/2003 | Cox et al. ................ 56/10.2 R |
| 6,525,276 B1 | * | 2/2003 | Vellidus et al. ............. 177/136 |
| 6,553,300 B1 | * | 4/2003 | Ma et al. ...................... 701/50 |
| 6,668,223 B1 | * | 12/2003 | Blackmore et al. ........... 701/50 |

FOREIGN PATENT DOCUMENTS

| EP | 0960558 A | 12/1999 |
| GB | 2350275 A | 11/2000 |
| WO | WO 0010377 A | 3/2000 |

* cited by examiner

*Primary Examiner*—Donald McEheny, Jr.
(74) *Attorney, Agent, or Firm*—Michael G. Harms; John William Stader; Stephen A. Bucchiancri (57) ABSTRACT

A method of estimating the instantaneous crop yield $\hat{y}_2(t)$ at time t in a field, during harvesting with a harvesting machine that operates by cutting and/or controlling the crop and has a crop mass flow sensor that measures the mass flow rate of crop processed by the machine at a location remote from that at which the harvesting machine cuts the crop and generates a signal $\hat{m}_{out}(t)$ indicative thereof, including the steps of: generating a mass flow rate signal $\hat{m}_{out}(t)$ using the sensor; generating an area rate signal $\hat{s}(t)$ indicative of time domain variations in the area of the field harvested per time unit; filtering the area rate signal $\hat{s}(t)$ using a function P(s) representative of the dynamics of the harvesting machine to generate a filtered area rate signal $\hat{s}_2(t)$; and using the filtered area rate signal $\hat{s}_2(t)$ for deriving from the mass flow rate signal $\hat{m}_{out}(t)$ a yield per area unit $\hat{y}_2(t)$.

27 Claims, 4 Drawing Sheets

METHOD OF ESTIMATING CROP YIELDS

FIELD OF THE INVENTION

This invention relates to a method of estimating crop yields during harvesting of a field using a harvesting machine, such as but not limited to a combine harvester, that operates by cutting and/or collecting crop. Such a machine may typically process the crop after cutting it.

BACKGROUND OF THE INVENTION

Other kinds of harvesting machines, such as beet or potato harvesters, dig roots and tubers from the soil. Balers collect hay that has been previously cut using a mower or reaper; and flax harvesters pull flax from the ground. In some countries wheat crops are cut and left to day on a field before being collected by a combine harvester equipped with a draper header.

In a combine harvester, cut ears of crop are conveyed inside the machine, where grains are separated from the remainder of the biological matter therewith in a threshing mechanism.

The resulting, cleaned grains are conveyed to a clean grain tank within the combine harvester while short pieces of straw, chaff, tailings, husks, dust, etc. (herein "secondary products") are returned to the field.

Such terms are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are known as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Not all the ears of corn are completely threshed in the threshing mechanisms so a combine harvester typically includes both a forward grain path (i.e. the normal path between its cutter bar and the clean grain tank); and a return path, that is a physical feedback path via which incompletely threshed ears are recycled to the start of the threshing process for re-threshing.

In recent years it has become increasingly important to be able to log the yield of a crop-producing field, with high accuracy.

One of the many reasons for which such logging is desirable is that a farmer may wish to know which parts of a field produce a high crop yield; and which parts a low yield. The farmer can then use a yield map of the field, made by storing in digital form yield data logged at the time of harvesting the field, to control e.g. a computer controlled fertiliser spreader attached to a tractor in order to improve the fertility of the low yield portions. The yield map may also be used e.g. for identifying field portions where intensified weed control is required.

Since agrochemicals usually constitute an important cost factor it is important for economic reasons that the farmer sprays no more of a field than is necessary.

Correct dosing of different parts of a field is also important for environmental reasons. For example, some agrochemicals actually reduce soil fertility if they are applied in too high a concentration; and of course farmers perpetually seek to minimise rainwater run-off of agrochemicals into drainage channels and thence into the local environment.

A combine harvester is in principle ideal for logging field yield data since it travels about the field while it harvests crop, thereby facilitating contemporaneous logging of site-specific yield data.

However various inherent features of combine harvester designs render the yield data logged during harvesting less accurate than they might otherwise be.

One significant factor is that it is neither possible nor desirable to log crop yields at the cutter bar of the combine harvester. This is partly because the width over which the cutter bar cuts crop makes it impossible to log all of the crop without seriously impeding the flow of crop and thereby reducing the work rate of the harvesting machine. Also, of course, the locality of the cutter bar is a harsh environment. Consequently the output signals of cutter bar-mounted transducers are likely to include considerable noise.

Furthermore it is of course much more valuable to know the yield of grains, as opposed to the yield of grains plus secondary harvesting products commonly referred to as material other than grain ("MOG" herein). The former kind of yield data is not obtainable at the cutter bar because at that stage no separation of grains from the MOG occurs.

For these and other reasons the harvested crop yield is measured in a combine harvester using a grain mass flow rate sensor located at the end of the forward grain path, beyond the branch that defines the return path.

Measuring the grain yield at such a location in a combine harvester is less accurate than it might be, for the following reasons:

1. There is a time delay of $\Delta t$ seconds, wherein typically $9 \leq \Delta t \leq 20s$, between cutting of crop at the cutter bar and the cleaned grain impacting the mass flow sensor;
2. The dynamics of the forward and return grain paths introduce noise that must be eliminated from any model used for estimating the true crop yield from a grain mass flow sensor output.

There are presently two main approaches to the calculation of yield estimates from the output signal of the grain mass flow sensor.

The so-called "Classical Approach" to yield mapping systems derives the yield from the formula:

$$\hat{y}(t) = \frac{\hat{m}(t)}{\hat{v}(t) * \hat{w}(t)} = \frac{\hat{m}(t)}{\hat{s}(t)} \quad (1)$$

Wherein $\hat{y}(t)$ is the derived yield ratio (kg/m²), $\hat{m}_{out}(t)$ is the measured mass flowrate (kg/s) derived from the output signal from the mass flow rate sensor; $\hat{v}(t)$ is the forward speed (m/s) of the combine harvester, determined using e.g. a radar Doppler sensor or equivalent device; and $\hat{w}(t)$ or working width is the effective width (m) of the cutter bar of the harvester, i.e. the width of the cutter bar section actually engaging and cutting the crop. The speed and width factors may be combined into a single estimated surface rate $\hat{s}(t)$ (m²/s).

The yield result for each instant cannot be related directly to the location where the combine harvester was at the time of the yield measurement. As noted hereinabove, there is a substantial time delay between the moment the grain stalks are cut and the moment the threshed grain passes through the mass flow rate sensor. This delay depends on the type of harvester and on the location of the sensor.

Accordingly the mass flow rate signal at time t(x) is divided by the speed and cutter bar working width values at the time t(x−Δt). The resulting yield estimate is allocated to the location of the combine at time t(x−Δt), when the collected data are stored in a memory device or used to generate a field yield map.

The classical system does not take account of the filtering or smoothening action resulting from the threshing process. A step change in the rate of ingestion of crop into the inlet of the header (e.g. when entering a field) does not result in a sharp step function at the mass flow rate sensor. There is some "smearing" effect.

It has therefore previously been proposed to model the estimated grain yield $\hat{y}_1(t)$ at time instant t by a technique (referred to herein as "Inverse Dynamics" filtering) involving filtering the grain mass flow sensor output signal with the inverse of a function P(s) that models the dynamics of the forward and return grain paths.

Such a technique has been found to model well the changes in grain feed rate that derive from changes in the field conditions encountered by the combine harvester. However the available output signal contains much high frequency noise, so it is also necessary to apply a low pass filter to the signal. Depending on the choice of cut-off frequency of the low pass filter, much valuable data may be lost during the low pass filtering, with the result that, overall, inverse dynamics filtering tends to underestimate the true grain yield under certain circumstances. Furthermore, the function P(s) itself presents some low-pass characteristics, such that the inverse function tends to exaggerate the influence of random variations of the output signal. Hence, the use of "Inverse Dynamics" does not necessarily provide a true picture of the actual field rates.

SUMMARY OF THE INVENTION

Therefore it is an object of the present invention to provide a method for improving the quality of yield maps and generating yield data which take account of the dynamics of the harvester but which do not suffer from unacceptably increased effects of random noise.

According to a first aspect of the invention there is provided a method of estimating the instantaneous crop yield $\hat{y}_2(t)$ at time t in a field, during harvesting with a harvesting machine that operates by cutting the crop and has a crop mass flow sensor that measures the mass flow rate of crop processed by the machine at a location remote from that at which the harvesting machine cuts the crop and generates a signal $\hat{m}_{out}(t)$ indicative thereof, the method comprising the steps of:

(i) generating a mass flow rate signal $\hat{m}_{out}(t)$ using the mass flow sensor; and (ii) generating an area rate signal $\hat{s}(t)$ indicative of time domain variations in the area of the field harvested per time unit;

characterised in that it comprises the further steps of:

(iii) filtering the area rate signal $\hat{s}(t)$ using a function P(s) representative of the dynamics of the harvesting machine to generate a filtered area rate signal $\hat{s}_2(t)$; and (iv) using the filtered area rate signal $\hat{s}_2(t)$ for deriving from the mass flow rate signal $\hat{m}_{out}(t)$ a yield per area unit.

As used herein, $\dot{m}_{out}(t)$ is standing for the actual mass flow rate along the mass flow sensor, and $\hat{m}_{out}(t)$ is standing for the mass flow rate as established by the mass flow sensor (measurement results).

This method avoids the need for a low pass filter of the kind used in the "Inverse Dynamics" technique as discussed hereinabove. Consequently the method of the invention is less likely to underestimate or overestimate the grain yield in the periods immediately before and after a step change in the mass flow rate resulting from a change in the rate of the area of the field harvested at time t.

Changes in the area of the field harvested can result from, for example:

1. Raising of the header to permit turning of the harvesting machine on cropless headlands;
2. Raising of the header to prevent ingestion of cut secondary products when the harvesting machine crosses a portion of a field that has previously been harvested;
3. Stopping and reversing of the harvesting machine, during which times the ingestion of crop ceases;
4. Continuous variation of the width of field cut when the combine harvester reaches the edge of a triangular field; and
5. Speed reductions to provide for better take in of a layered crop; and speed increases when the harvesting machine returns to an area of standing crop.

Such changes in the area of the field harvested per unit time, even if instigated as step changes at the cutter bar (e.g. when the header is raised or lowered abruptly) are of the kind that cause immediate changes to the amount of crop ingested, but that are not immediately recognisable from the mass flow rate signal because of the aforesaid "smearing" effect. Consequently they do not result in step changes in the mass flow rate of cleaned grain detected by the mass flow sensor.

The so-called Classical Approach discussed hereinabove takes no account of such smearing; whereas the method of the invention advantageously replicates the smearing effect of step changes in the area of field harvested per unit time in the model that is used to estimate the instantaneous yield. Consequently the yield data obtained using the method of the invention are more accurate, when considering changes in the mass flow rate of grain deriving from changes in the area of field harvested per unit time, than any of the prior art methods.

Preferably the instantaneous yield $\hat{y}_2(t)$ (kg/m²) is estimated according to the expression:

$$\hat{y}_2(t) = \frac{\hat{m}_{out}(t)}{L^{-1}(P(s)\hat{S}(s))} \quad (2)$$

Wherein $\hat{S}(s)$ represents the Laplace transform of the measured surface or area rate $\hat{s}(t)$ and P(s) the Laplace transform of the dynamics of crop path in the harvesting machine.

The use of Laplace transforms to model the filtering of the mass flow rate signal takes advantage of the linearity of Laplace transforms and consequently facilitates signal processing when the method is carried out using a computer.

More preferably still the method includes the further step (v) of shifting the resulting estimated yield value $\hat{y}_2(t)$ by a period Δt representative of a delay between cutting of the crop by the harvesting machine and measuring the mass flow rate by the crop mass flow sensor.

This allows referencing of the yield estimation to a time $t-\Delta t$ at which the crop in question was harvested, thereby allowing position-accurate logging of a field for the purpose of creation of a yield map.

Consequently the method preferably includes the step of mapping the time shifted crop yield values for a range of values of t, whereby to obtain a yield map of a field or part thereof.

The steps (ii)–(iv), respectively, of filtering the area rate signal, applying the filtered signal to the mass flow rate signal $\hat{m}_{out}(t)$; and referencing the filtered results to time $t-\Delta t$, may be carried out in real time by a computer carried by or operatively connected to the harvesting machine.

This facilitates the optional method step of recording a series of the crop yield values in a memory.

On the other hand, it is preferable that the step (vi), of mapping the time shifted crop yield values in order to obtain a field yield map, takes place off line from the computer carried by our operatively connected to the harvesting machine, using the crop yield values stored in the memory.

This step is advantageous because the steps involved in producing the yield map require considerable processing power and consequently would take a long time to complete using a mobile computer carried by the harvesting machine.

In preferred embodiments of the method of the invention, the function P(s) includes functions $F_1(s)$, $F_2(s)$ and $F_3(s)$ that respectively model the dynamics of different sub-systems in the forward path of crop via the harvesting machine.

Each one of $F_1(s)$, $F_2(s)$ and $F_3(s)$ may, if desired, be in the form of discrete approximations to the non-linear sub-systems forming part of the forward grain path of a combine harvester.

Optional, preferred features of the method are defined in Claims 9 to 15 hereof.

It is also preferable that the function P(s) includes a function R(s) that models the flow of incompletely processed crop, via a return path defined in the harvesting machine, for further processing.

It is particularly preferable that the function R(s) is substantially non-dynamic, whereby accurately to model the return path for incompletely threshed ears (tailings).

Typically the solution of R(s) will be based on a discrete approximation of the proportion of the crop in the harvesting machine that flows via the return path.

This is because the performance of the algebraic model utilised in carrying out the method of the invention varies partially in dependence on the value of the solution of R(s) selected.

Consequently it is desirable, when operating the method in a specific combine harvester, to programme the solution of R(s) as a discrete value of the percentage of tailings and MOG that return via the return path. Such a discrete value may be established by experimentation using a combine harvester of the same type as that in which the method steps will occur.

Conveniently the sampling rate at which the method is repeated is 1 Hz. This is the same as the typical sampling rate of a mass flow rate in a combine harvester.

As noted herein the method of the invention is particularly suitable for modelling changes in the crop yield resulting from changes in time domain variations in the area of the field harvested at time t. Therefore the method optionally includes the steps of:

(ix) assessing whether variations in the flow of crop through the harvesting machine derive predominantly from time domain variations in the area of the field harvested at time t; and (x) carrying out the method if the result of the assessment is affirmative.

According to a second aspect of the invention there is provided a method of estimating the instantaneous crop yield in a field during harvesting using a harvesting machine that operates by cutting the crop and has a crop mass flow sensor, that measures the mass flow rate of crop passing through the harvesting machine and generates a signal $\hat{m}_{out}(t)$ indicative thereof, the method including the steps of:

(xi) assessing whether variations in the flow of crop through the harvesting machine derive predominantly from time domain variations in the field conditions;

(xii) if the result of the assessment is affirmative, generating a the mass flow rate signal $\hat{m}_{out}(s)$ using the sensor, filtering the signal using a function $P^{-1}(s)$ that models the inverse dynamics of the flow of crop through the harvesting machine and additionally filtering the signal using a function F(s) that is a low pass filter to generate an estimate $\hat{y}_1(t)$ of the instantaneous crop yield at time t; and (xiii) if the result of the assessment is negative carrying out the method steps (i) to (iv) of the method according to Claim 1 hereof.

The method of the second aspect of the invention advantageously permits selection between the "Inverse Dynamics" filtering method and the method of the first aspect of the invention, in dependence on whether variations in the crop yield derive predominantly from time domain area variations or time domain field condition variations.

Preferably $\hat{y}_1(t)$ is determined by the expression:

$$\hat{y}_1(t) = \frac{L^{-1}(P^{-1}(s)F(s)\hat{m}_{out}(s))}{\hat{s}(t)} \quad (3)$$

wherein $\hat{s}(t)$ is the field surface harvested at instant t.

In a specific embodiment of the method of the second aspect of the invention, the cut off frequency of the low pass filter F(s) is 0.2 Hz.

The method of the second aspect of the invention may optionally include carrying out one or more of the steps defined in Claims 2 to 12 hereof.

According to a third aspect of the invention there is provided a harvesting machine that operates by cutting and/or collecting the crop and has a crop mass flow sensor, that measures the mass flow rate of crop processed by the machine at a location remote from that at which the harvesting machine cuts or collects the crop, the harvesting machine including a computer programmed to carry out the method steps (i) to (iv) of Claim 1.

Optionally the computer of the harvesting machine of the third aspect of the invention is additionally programmed to carry out the method steps of one or more of Claims 1 to 19 hereof.

According to a fourth aspect of the invention there is provided a harvesting machine that operates by cutting and/or collecting crop and has a crop mass flow sensor, that measures the mass flow rate of crop processed by the machine at a location remote from that at which the harvesting machine cuts or collects the crop, the harvesting machine including a computer programmed to carry out the method of Claim 21.

Optionally the computer of the harvesting machine of the fourth aspect of the invention is programmed additionally to carry out the methods of one or more of Claims 22 to 25 hereof.

DESCRIPTION OF THE DRAWINGS

There now follows a description of preferred embodiments of the invention, by way of non-limiting example, with reference being made to the accompanying figures in which.

DETAILED DESCRIPTION OF THE PREFERRED EMBODIMENTS

Figure 1:
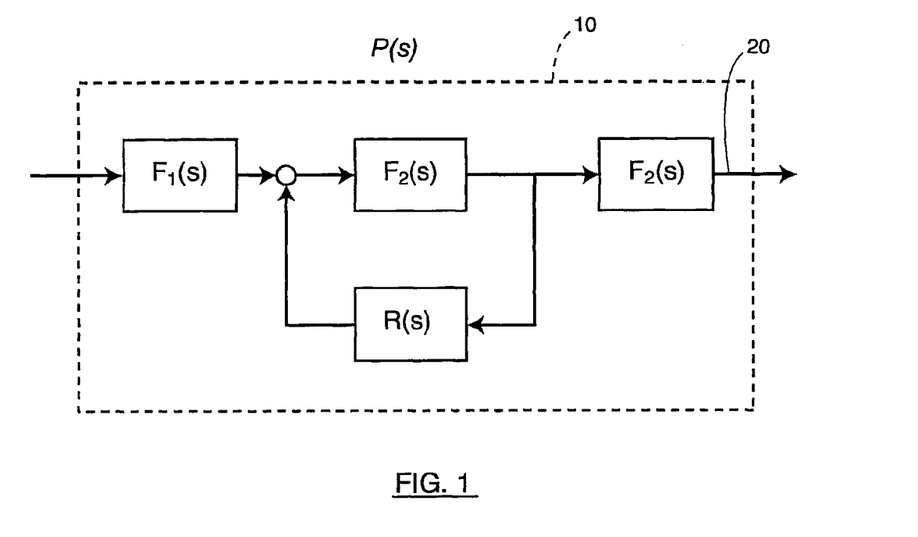
FIG. 1 is a schematic representation of the forward and return grain paths in a combine

FIG. 1 of the drawings shows in schematic form a model of the dynamics of the forward and return grain paths in a combine harvester.

The Laplace transform of the overall transfer function of the machine dynamics is P(s), signified by the dotted boundary 10 in FIG. 1.

Within boundary 10 three forward grain path subsystems are modelled by the transfer functions $F_1(s)$, $F_2(s)$ and $F_3(s)$. In a typical combine harvester, $F_1(s)$ may model the dynamics of the header and threshing unit; $F_2(s)$ may model the dynamics of the grain cleaning unit and sieves; and $F_3(s)$ may model the augers and elevator that convey grain to the clean grain store.

Transfer function P(s) also includes function R(s) that models the return flow path of tailings and MOG. Typically the functions constituting the overall transfer function of the machine dynamics P(s) may be determined experimentally. The components of the machine dynamics P(s) may be derived from experimental results for sections of the system, which are then combined into one global model.

The function R(s) typically is non-dynamic. It therefore may be modelled as a combination of gain ρ and a fixed transport delay $\Delta T_{return}$. The gain stands for the fraction ρ of the forward flow that enters the return loop. Typically this fraction is about 10% during the harvest of cereals. In other conditions this gain can very substantially (maize: 0%; cereals and tightly set grain sieve: 30%).

One value of the return fraction ρ that has been found to be useful for a particular combine harvester is a return flow of 20%.

The parameters of the transfer functions $F_3(s)$, $F_2(s)$, $F_1(s)$ may be determined as best linear approximations of the intrinsic non-linear systems.

Consequently the overall machine dynamics P(s) can be modelled as a combination of an algebraic return flow compensation and a best linear approximation of the dynamics in the forward grain path.

The combine harvester modelled by function P(s) includes a grain mass flow sensor represented schematically by numeral 20 in FIG. 1. The combine harvester additionally includes numerous other sensors (not shown in FIG. 1) for detecting (at least) the vehicle speed and position; and the status of the header bar.

The method of the invention of estimating the instantaneous crop yield $\hat{y}_2(t)$ at time t during harvesting in a field using a combine harvester represented schematically by numeral 10 in FIG. 1 and that operates by cutting the crop and has a crop mass flow sensor that measures the mass flow rate $\dot{m}_{out}(t)$ of crop processed by the machine at a location remote from that at which the harvesting machine cuts the crop and generates a signal $\hat{\dot{m}}_{out}(t)$ indicative thereof, the method comprising the steps of:

(i) generating a the mass flow rate signal $\hat{\dot{m}}_{out}(t)$ using the sensor;

(ii) generating an area rate signal $\hat{s}(t)$ indicative of time domain variations in the area of the field harvested per time unit;

(iii) filtering the area rate signal $\hat{s}(t)$ using a function P(s) representative of the dynamics of the harvesting machine to generate a filtered area rate signal $\hat{s}_2(t)$; and (iv) using the filtered area rate signal $\hat{s}_2(t)$ for deriving from the mass flow rate signal $\hat{\dot{m}}_{out}(t)$ a yield per area unit $\hat{y}_2(t)$.

These steps are carried out using a computer carried by or operatively connected (e.g. by an infra red wireless link) to the combine harvester, and more specifically to the various sensors thereof. Alternatively the combine harvester may include a simple memory device for logging the mass flow and area rate data. Such data may if desired be downloaded to a remote computer for carrying out steps (iii) and (iv) after the end of a harvesting operation.

As noted herein $\hat{y}_2(t)$ is estimated according to the expression:

$$\hat{y}_2(t) = \frac{\hat{\dot{m}}_{out}(t)}{\hat{s}_2(t)} = \frac{\hat{\dot{m}}_{out}(t)}{L^{-1}(P(s)\hat{S}(s))} \quad (2)$$

The function $\hat{S}(s)$ may be determined from data logged at the sampling frequency of e.g. the aforesaid computer carried by or operatively connected to the combine harvester.

At regular intervals (e.g. 1 second) a set of data is screened by the computer and loaded into an internal or external memory. Typically these data include the position of the combine harvester (determined from the output of a GPS sensor); the speed of the machine; the mass flow measured by the mass flow rate sensor near the clean grain tank; and the status of the header.

Optionally the sample data may also include data on the actual cutting width at the cutter bar, as sensed by a contactless distance sensor; and the amount of return flow, as sensed by a return flow sensor.

The speed data $\hat{s}(t)$ may be converted to a register of processed speed data, used for determining $\hat{s}_2(t)$.

For one combine harvester, having a zero return flow, the formula for obtaining the processed speed data register is $$\hat{s}_2(t)=0.0376*\hat{s}(t-10)+0.0304*\hat{s}(t-11)+0.002*\hat{s}(t-12)+ \\ 2*\hat{s}_2(t-1)-1.6*\hat{s}_2(t-2)+0.63*\hat{s}_2(t-3)-0.1*\hat{s}_2(t-4) \quad (4)$$

in which $\hat{s}(t)$ represents the untreated logged speed data and $\hat{s}_2(t)$ the filtered results. Where both speed and cutting width data are available, the same filter may be applied to the surface rate data which are derivable therefrom (cutting width * speed).

The transfer function on which the formula is based has been calculated for a zero return rate of incompletely threshed tailings. If in a particular combine harvester the return rate is non-zero, and the ratio $\rho$ of the cut crop that is returned is approximately known, it is possible to transform the measured mass flow rate signals corresponding to a non-zero return flow fraction into the reference case where no return flow is present. In such a case the above-noted formula applies. The transformation of the non-zero return flow fraction may be carried out using a computer programmed to operate an algorithm.

There now follows a description, that falls within the scope of the method of the invention, of various techniques for transforming a non-zero return flow ratio $\rho$:

Adapting the Transfer Function Parameters to Changing Harvester Conditions

According to the method of the invention as defined herein, the instantaneous yield rate measurement $\hat{m}_2(t)$ (measured by the mass flow sensor) is compared to a filtered area rate $\hat{s}_2(t)$. Under normal working conditions, where the working width of the header is constant, the yield rate may be compared to the product of this working width and a filtered speed rate. The filter applied to the speed rate is representative of the dynamics of the crop processing system.

The dynamics can be represented by a transfer function P(s) for a particular machine setting. However, the parameters of the transfer function will vary if the machine setting is changed. The transfer function will be influenced by changes to the threshing drum speed, threshing concave spacing, cleaning fan speed, chaffer and grain sieve opening, etc. Nonetheless, it is possible to adapt the filter parameters automatically to the machine setting.

Such parameters may be derived from the settings themselves, which may be monitored by dedicated sensors. For instance, combine harvesters commonly are provided with drum and fan speed sensors, providing signals which can be used for adapting the process parameters.

It is also possible to derive the modification to the parameters from measurements on the crop flow itself. One way of achieving this is derived from the influence of varying return flow, i.e. the fraction of the harvested and (incompletely) threshed crop material which is not blown out of the combine and reaches the end of the chaffer sieve from where it is fed via the aforesaid return grain path, that includes a rethresher, back to the cleaning system. The amount of return material depends primarily on the setting of the sieve opening, but may also be influenced by the setting of the concave clearance: a more aggressive concave setting will produce more short straw and chaff which increases the sieve load and hence the flow to the return system.

The total amount of returned material (grain+MOG) may be monitored by a return flow sensor, e.g. of the type described in EP-A-0 463 240. As a first approximation the amount of returned grain may be assumed to be a fixed fraction of this total amount. Accordingly an estimate $\hat{x}(t)$ of the amount of returned grain can be derived from the signal of the return flow sensor. The division factor $\rho$ is the ratio of the return grain flow $x(t)$ to the cleaning system flow, i.e. the sum of the return grain flow $x(t)$ and the direct grain flow $y_R(t)$ (i.e. the grain which is fed directly to the grain tank and the grain flow sensor). Once a steady state has been reached the fraction $\rho$ can be derived from the formula:

$$\rho = \frac{x(t)}{x(t)+y_R(t)} \quad (a)$$

The fraction $x(t)$ is fed to the return system, comprising the tailings auger, the rethresher, the tailings elevator and the impeller, modelled by transfer function R(s) in FIG. 1. As these components provide for a high speed when compared to the influence of their own dynamics, the transfer function may be approximated by a simple time delay $\Delta T_{return}$. It is supposed the return system has little "smearing" effect on the crop flow $x(t)$ fed thereto.

Figure 5:
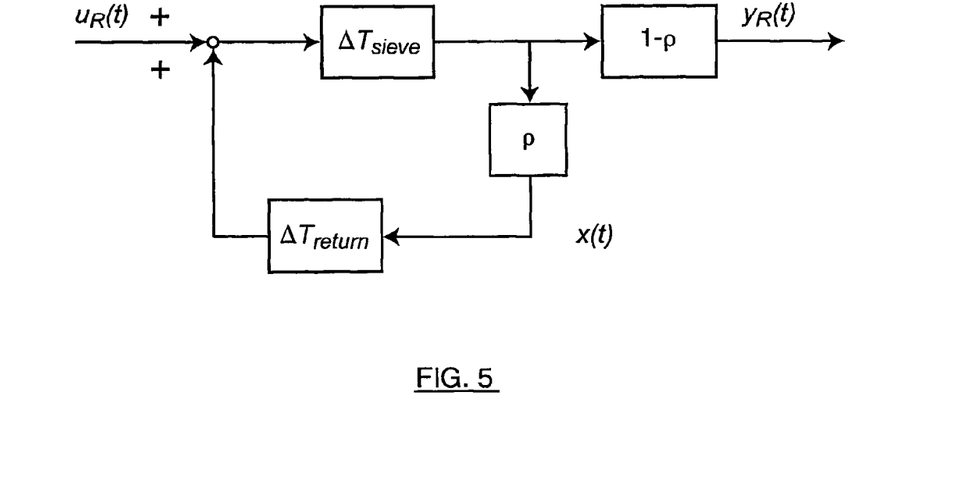
FIG. 5 is a schematic representation used for modelling the effect of a non-zero returned grain flow in a combine harvester.

The rethreshed crop is delivered in front of the sieves where it mixes with the fresh crop from the threshing and separating system. The dynamics of the sieves are indicated by $F_2(s)$ in FIG. 1. They convey the grain and chaff rearwardly at a steady rate. Accordingly it is possible to model them as another time delay $\Delta T_{sieve}$. The resulting model for cleaning system is represented in FIG. 5. In FIG. 5, $u_R(t)$ represents the fresh crop flow from the threshing and separating system, i.e. the output of transfer function $F_1(s)$ of FIG. 1.

From this model, the influence of changes to the return ratio $\rho$ on the machine model P(s) easily can be established. The value of $\rho$ can be derived from the return and grain flow sensors as described above. Application of the adapter transfer function P(s) to the speed (or area) provides for a better assessment of the yield rate estimate $\hat{y}_2(t)$ in accordance with Equation (2) hereof.

From the model of FIG. 5 following equations can be derived:

$$y_R(t+\Delta T_{presieve})=(1-\rho)(u_R(t)+x(t-\Delta T_{return})) \quad (b)$$

$$x(t) = \frac{\rho\, y_R(t)}{1-\rho} \quad (c)$$

These formulae can be combined to derive the output values $y_R(t)$ from the input values $u_R(t)$ and the return ratio value $\rho$:

$$y_R(t)=(1-\rho)u_R(t-\Delta T_{presieve})+\rho\cdot y_R(t-\Delta_{return}-\Delta T_{presieve}) \quad (d)$$

From the combination of formulae (b) and (c) one can also derive the input $u_R(t)$ of the cleaning system from the output $y_R(t)$ and the value of $\rho$:

$$u_R(t) = \frac{1}{1-\rho}[y_R(t+\Delta T_{presieve})-\rho\cdot y_R(t-\Delta T_{return})] \quad (e)$$

It is now possible to predict the output $y'_R(t)$ in case no return would have been allowed ($\rho=0$):

$$y'_R(t)=u_R(t-\Delta T_{presieve}) \quad (f)$$

Hence:

$$y'_R(t) = \frac{1}{1-\rho}[y_R(t) - \rho \cdot y_R(t - \Delta T_{return} - \Delta T_{presieve})] \quad (g)$$

This formula provides the means for deriving from the actual output rate data, the theoretical output rate which would be obtained in case no return flow would have been allowed.

Typical values for the time delays are 10 seconds for $\Delta T_{return}$ and 2.75 s for $\Delta T_{sieve}$.

Where discrete mass flow rate measurements are made at a frequency of 1 Hz, the theoretical mass flow rate measurement $\hat{m}'_{out}(t)$ for zero return can be calculated from:

$$\hat{m}'_{out}(t) = \frac{1}{1-\rho}[\hat{m}_{out}(t) - \rho \cdot \hat{m}_{out}(t - 13)] \quad (h)$$

I. It has been indicated that a transfer function P(s) can be established for a machine wherein no return is allowed. The inverted formula can be used for reconstructing a mass flow estimate $\hat{y}_1(t)$ from the (zero return) mass flow rate $\hat{m}'_{out}(t)$ at the sensor. The values of the zero return mass flow rate $\hat{m}'_{out}(t)$ can be derived from the actually measured mass flow rates $\hat{m}_{out}(t)$ and the return flow ratio ρ using the formula (h) above.

II. When one does not wish to use the inversion method, one may consider the surface filter approach defined herein. In order to establish the instantaneous yield rate value, the calculated zero return mass flow rate $\hat{m}'_{out}(t)$ is compared to the filtered area/speed rate value $\hat{s}_2(t)$, wherein the filter applied to the measured speed values $\hat{s}(t)$ is representative of the known machine dynamics for a zero return configuration.

$$\hat{s}_2(t) = L^{-1}(P(s)\hat{S}(s)) \quad (i)$$

In a particular embodiment, the second step may take the form of:

$$\hat{s}_2(t) = 0.0376*\hat{s}(t-10) + 0.0304*\hat{s}(t-11) + 0.002*\hat{s}(t-12) + 2*\hat{s}_2(t-1) - 1.6*\hat{s}_2(t-2) + 0.63*\hat{s}_2(t-3) - 0.1*\hat{s}_2(t-4) \quad (j)$$

(i.e. Equation 4).

This embodiment accordingly provides for adapting first the measured crop flow values to a zero return condition first and then for filtering the area rate values using a filter representative of the dynamics of a zero return configuration. This method is feasible, but not preferred as it provides for the recalculation of two sets of data.

III. The preferred method provides for applying a filter to logged area (or speed) rate values alone. The filter used is the transfer function of the grain flow in the harvester. This transfer function may be seen as the combination of a transfer function for the zero return crop flow (formulae (h) and (i)) and the transfer function representative of the effects of the return flow.

Accordingly, for establishing the filtered values $\hat{s}_2(t)$, two filtering steps may be provided:

a first step for simulating the influence of machine dynamics, using the known dynamics for a zero return flow process:

$$\hat{s}_3(t) = L^{-1}(P(s)\hat{S}(s)) \quad (i)$$

Formula (j) above is suitable for a particular embodiment a second step for simulating the influence of the return flow ratio ρ. To this end a suitable filter can be derived from formula (d) above:

$$\hat{s}_2(t) = (1-\rho)\hat{s}_3(t - \Delta T_{presieve}) + \rho \cdot \hat{s}_3(t - \Delta T_{return} - \Delta T_{presieve}) \quad (k)$$

The measured grain mass flow rate $\hat{m}_{out}(t)$ can then be divided by the resulting value embodiment of paragraph II.

It is observed that the model used above was based on transfer functions $F_1(s)$, $F_2(s)$, $F_3(s)$ and R(s). Adapting the filter in accordance with changes to the return ratio ρ corresponds to changing the transfer functions $F_2(s)$ and R(s). This stage is still followed by the final transfer function $F_3(s)$. The method above appears to disregard the dynamic effects of $F_3(s)$ on the output $y_R(t)$ of $F_2(s)$. However, such an approach is allowable as $F_3(s)$, which models the conveyors and elevators between the cleaning system and the grain tank, primarily is constituted by a simple time delay, with little other dynamic effect on the spread of the crop flow. Consequently no extra filtering step is needed in order to take account of additional "smearing" of the output of $F_2(s)$ by $F_3(s)$.

The example above illustrates how the filter to be applied to the surface rate can be modified in accordance with a measured return ratio value ρ which is derived from the output of a return flow monitor. Similar models may be developed for adapting the dynamic model of the harvester to flow related sensors at other locations of the harvester. Examples thereof are the grain loss sensors at the end of the sieves or of the separating system, mass or volume flow sensors at one of the elevators, torque sensors in one of the drive-lines to components of the threshing and cleaning system, etc.

Figure 2:
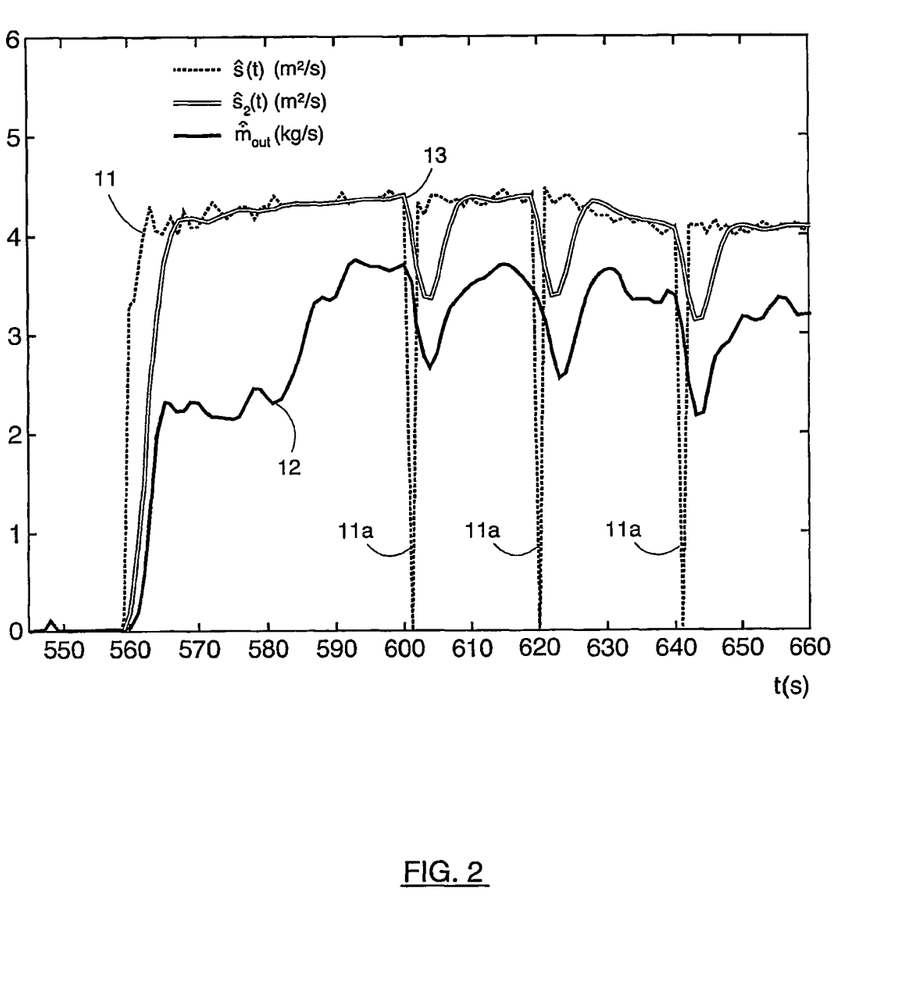
FIG. 2 is a series of plots illustrating construction of an instantaneous crop yield value according to the method of the first aspect of the invention.

FIG. 2 shows in a graphical form the stages in the method of the first aspect of the invention, for estimating $\hat{y}_2(t)$ (i.e. the instantaneous crop yield at time t in a field, in which time domain variations in the area of the field harvested at time t predominate).

FIG. 2 is a time based plot showing firstly (line 11) the measured surface rate $\hat{s}(t)$ harvested at time t. The surface rate is calculated by multiplying the measured speed $\hat{v}(t)$ of the combine harvester by the known working width measurement $\hat{w}(t)$ of the combine harvester header.

Line 13 is the plot for the filtered surface rate $\hat{s}_2(t)$. This is simply calculated using an equation such as Equation 4 hereinabove.

Line 11 clearly shows locations 11a at which the surface harvested becomes zero at locations where no crop is ingested into the combine harvester. Such events occur e.g. during raising of the header, stopping or reversing of the machine, and numerous of the other surface area variations discussed herein.

Line 12 of FIG. 2 is a plot of the output of the mass flow rate sensor adjacent the clean grain tank of the combine harvester. Consequently this is a direct plot of $\hat{m}_{out}(t)$ used in Equation 2.

This shows the time delay in the effect of the downward peaks in the $\hat{s}(t)$ plot 11.

If the grain yield $\hat{y}(t)$ were to be estimated using the classical approach, $\hat{m}_{out}(t)$ would simply be divided by $\hat{s}(t)$ resulting in infinite values for the short empty strokes and an overall underestimation of the yield $\hat{y}(t)$ before and after abrupt changes in the mass flow rate resulting from changes in the surface harvested.

Line 13 of FIG. 2 plots the filtered surface rate values $\hat{s}(t)$ following carrying out of the method of the invention e.g. by an onboard computer located in or operatively connected to the sensors of the combine harvester. Alternatively a remote computer may be used to process data logged by the combine harvester. Regardless of the precise arrangement of computers, the surface rate is filtered by P(s), the overall transfer function of the machine dynamics (including a compensation for non-zero return flow of incompletely threshed tailings).

As shown, line 13 of FIG. 2 is a reference signal also containing the spread peaks corresponding to the changes in yield resulting from the downward spikes in the ŝ(t) signal. The peaks are spread from the downward strokes 11a by a period Δt corresponding to the time delay between cutting of the crop and measurement of the mass flow rate at the sensor within the combine harvester.

The surface estimates $\hat{s}_2(t)$ of line 13 enable a robust and unbiased estimation $\hat{y}_2(t)$ of the local grain yield before and after abrupt feed rate variations. There is no underestimation of the feed rate resulting from the downward spikes 11a.

When there is no variation in ŝ(t) (i.e. the surface area harvested per unit time is constant), the method of the invention does not deliver any perceptible dynamic compensation.

Nonetheless the yield may vary, as a result of changing field conditions. The method of the invention may therefore additionally include the step of assessing whether yield variations derive predominantly from time domain surface area harvested variations; or time domain field condition variations; and selecting whether to carry out the method of the first aspect of the invention or not, in dependence on the outcome of the assessment.

Such an assessment may, if desired, be carried out using a suitably programmed computer carried by or operatively connected to the combine harvester. To this end the computer may monitor the measured ŝ(t) or ŷ(t) values and react to variations exceeding a predetermined limit value.

In another embodiment of the method of the invention, if the aforesaid assessment indicates that the yield variations derive predominantly from variations in the field conditions, the method may include estimating the instantaneous yield at time t using the per se known Inverse Dynamics Filtering method; and if the assessment indicates that variations in the surface area harvester per unit time predominate, carrying the method of the first aspect of the invention as exemplified by FIG. 2.

More specifically the Inverse Dynamics Filtering method includes generating a the mass flow rate signal $\hat{m}_{out}(s)$ using the mass flow rate sensor; filtering the signal using a function F(s) that is a low pass filter and additionally filtering the signal using a function $P^{-1}(s)$ that models the inverse dynamics of the flow of crop through the harvesting machine. Finally the twice filtered mass flow rate signal is divided by the instantaneous surface rate ŝ(t) to generate an estimate $\hat{y}_1(t)$ of the instantaneous crop yield at time t.

The expression by which the yield ratio may be determined is:

$$\hat{y}_1(t) = \frac{L^{-1}(P^{-1}(s)F(s)\hat{m}_{out}(s))}{\hat{s}(t)} \quad (3)$$

wherein ŝ(t) is the measured field surface harvested per unit time at instant t.

In one embodiment the cut-off frequency of the low pass filter F(s) is 0.2 Hz. This has been found through experimentation to eliminate a substantial portion of the noise in the $\hat{m}_{out}(s)$ signal, without losing excessive amounts of data.

It is not possible to compare the accuracy and robustness of the estimations using the method of the first aspect of the invention and the Inverse Dynamics Filtering method, because to study the latter the actual local yield must be known. This cannot be determined in field conditions.

However, it is possible to compare the accuracy of the method of the first aspect of the invention with that of the prior art Classical Approach defined herein.

The following example is the result of a comparative study between the two methods.

EXAMPLE

A comparative study was performed on data from a field fertilised with different nitrogen gifts and sown with different crop densities. Four rows of 10 different N-gift plots of 15 meter width were grown one behind another. At the time of harvesting, 1 meter of crop was removed between each plot. In this way, controlled y(t)- and s(t)-variations are generated.

During the growing season, the farmers tried to keep the crop status as equal as possible within the same plot. As a consequence, the estimated grain yield within one plot was expected to be more or less constant. Due to the dynamic impact of the combine harvester and measurement noise, variations would have been registered.

As a reference signal for the $\hat{y}_2(t)$ estimation the Classical Approach was used. This standard procedure consists of the low-pass filter F(s) of Equation 4 together with a constant time shift.

Figure 3:
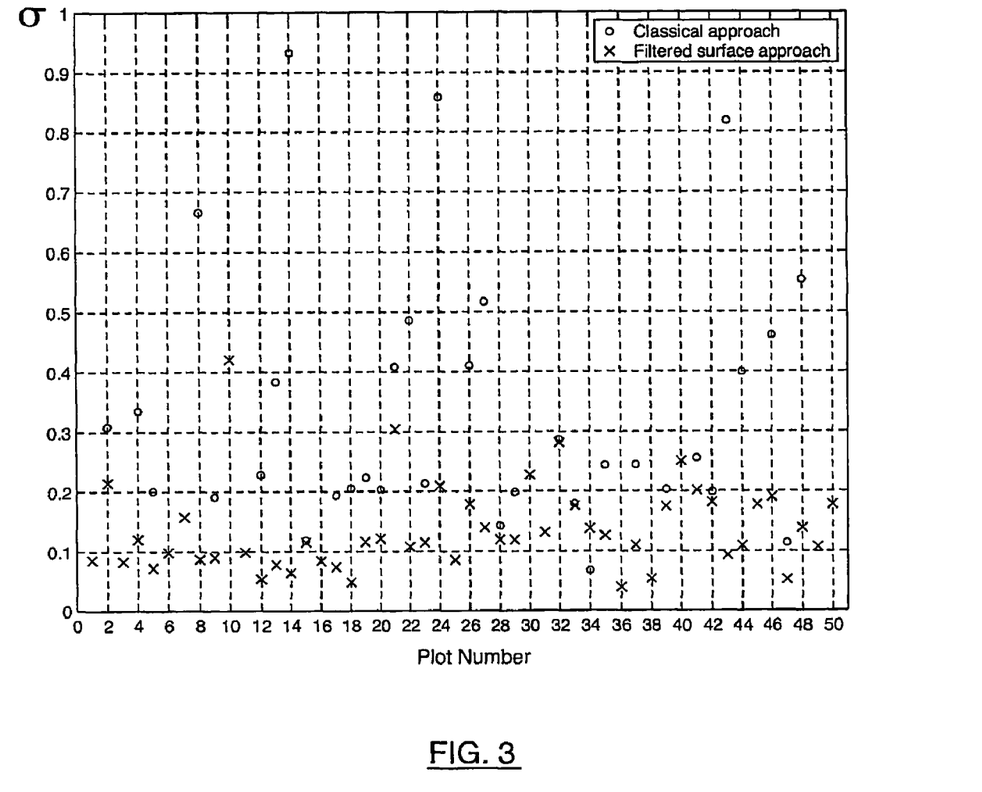
FIG. 3 is a plot of the variation coefficients comparing the robustness of the method of the first aspect of the invention against that of the so-called Classical Approach.

FIG. 3 gives the variation coefficients σ (standard deviation divided by mean value) within 50 plots. In FIG. 3 the circles represent the reference (Classical) results and the crosses the plots resulting from carrying out the method of the invention. A significant decrease in variation coefficient σ is apparent for the plots resulting from the method of the invention, in which the surface-flow ŝ(t) is filtered by P(s). There is only one plot (No. 34) where no improvement is found. The maximum variation coefficient for the model-based method of the invention is 0.42, in contrast with the maximum variation coefficient of Classical method of up to 3.5. The mean values of the coefficients σ are 0.853 for the Classical Approach and 0.136 for the model-based method of the invention.

Figure 4A:
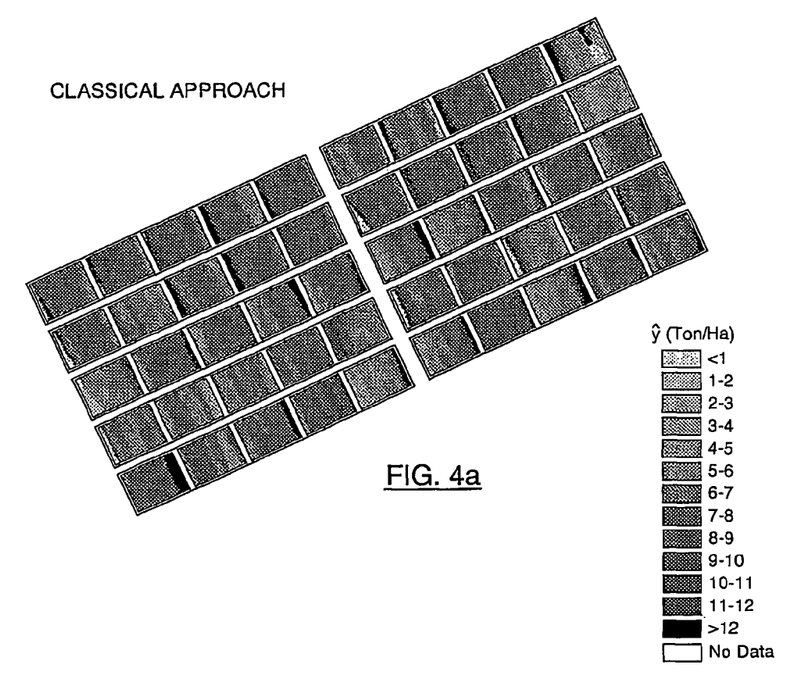
FIGS. 4a and 4b are yield maps constructed using the Classical Approach and method of the first aspect of the invention respectively.
Figure 4B:
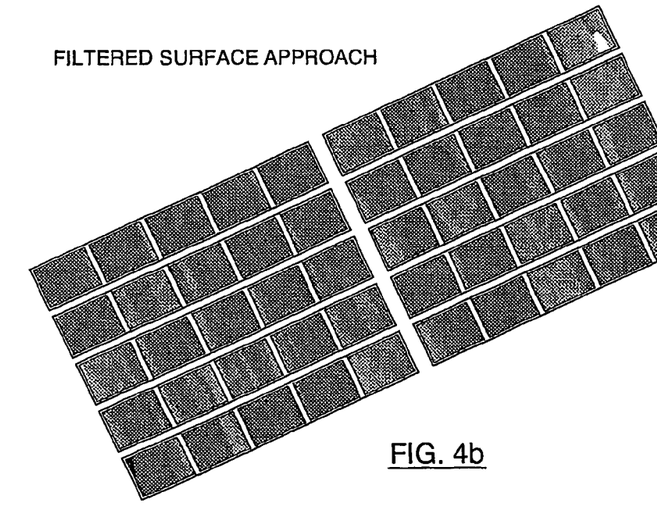

As a final result, grain yield maps calculated with the Classical Approach and the method of the invention estimation are constructed, as shown in respectively FIGS. 4a and 4b.

For indicating grain yield in places where no data points are measured, Inverse Distance Weights have been used as an interpolation technique.

The compensation for the smearing impact of the machine subsystems is clearly visible. Whereas the directions of motion of the combine harvester are easy to detect in FIG. 4a (the side with underestimated grain yield being the place where the combine harvester entered the plot, see FIG. 2), this is not the case for FIG. 4b. The actual grain yield was much more equal using the method of the invention than indicated by the Classical Approach.

Another improvement is the decrease of points containing 'bad' data. As indicated by FIG. 2, local grain yields can be overestimated in the case of abrupt feedrate variations. Those points should be thrown away, since they do not correspond with the actual grain yield. This immediately implies spots where no data is present as can be seen in FIG. 4.

The invention claimed is:

1. A method of estimating the instantaneous crop yield $\hat{y}_2(t)$ at time t in a field, during harvesting with a harvesting machine that operates by cutting and/or collecting the crop and has a crop mass flow sensor that measures the mass flow rate $\dot{m}_{out}(t)$ of crop processed by the machine at a location remote from that at which the harvesting machine cuts the crop and generates a signal $\hat{\dot{m}}_{out}(t)$ indicative thereof, the method comprising the steps of:
   (i) generating a said mass flow rare signal $\hat{\dot{m}}_{out}(t)$ using said mass flow sensor; and
   (ii) generating an area rate signal $\hat{s}(t)$ indicative of time domain variations in the area of the field harvested per time unit;
   characterized in that it comprises the further steps of:
   (iii) filtering said area rate signal $\hat{s}(t)$ using a function P(s) representative of the dynamics of the harvesting machine to generate a filtered area rate signal $\hat{s}_2(t)$; and
   (iv) using said filtered area rate signal $\hat{s}_2(t)$ for deriving from said mass flow rate signal in $\hat{\dot{m}}_{out}(t)$ a yield per area unit $\hat{y}_2(t)$.

2. A method according to claim 1, characterized in that the instantaneous yield $\hat{y}_2(t)$ is estimated according to the expression:

$$\hat{y}_2(t) = \frac{\hat{\dot{m}}_{out}(t)}{L^{-1}(P(s)\hat{S}(s))}$$

3. A method according to claim 1, characterized in that it includes the further step of (v) shifting the resulting estimated yield value $\hat{y}_2(t)$ by a time interval $\Delta t$ representative of a delay between cutting and/or collecting of the crop by the harvesting machine and measurement of the mass flow rate by the crop mass flow sensor.

4. A method according to claim 3, characterized in that it includes the further step of (vi) mapping the time shifted crop yield values for a range of values of t whereby to obtain a yield map of a field or part thereof.

5. A method according to claim 3, characterized in that the steps (ii)–(iv) are carried out in real time by a computer carried by or operatively connected to the harvesting machine.

6. A method according to claim 1, characterized in that it includes the step of (vii) recording a series of crop yield values in a memory.

7. A method according to claim 4, characterized in that it includes the step of (vii) recording a series of crop yield values in a memory, wherein the mapping step (vi) takes place offline from said computer using the crop yield values stored in said memory.

8. A method according to claim 1, characterized in that the function P(s) includes functions $F_1(s)$, $F_2(s)$ and $F_3(s)$ that respectively model the dynamics of different subsystems in the forward path of crop via the harvesting machine.

9. A method according to claim 1, characterized in that it includes the further steps of:
   (a) monitoring a machine condition;
   (b) automatically adapting the function P(s) to a changing machine condition.

10. A method according to claim 9, characterized in that said machine condition is a machine setting.

11. A method according to claim 10, characterized in that said machine condition is chosen from threshing drum or cleaning fan speeds, concave setting or sieve setting.

12. A method according to claim 9, characterized in that said machine condition is a distribution of crop flow over the machine.

13. A method according to claim 12, characterized in that said monitoring step includes monitoring a crop flow at a particular location of the machine.

14. A method according to claim 12, characterized in that said machine condition is the ratio ($\rho$) of a return crop flow to a full crop flow.

15. A method according to claim 9, characterized in that the sub-step of automatically adapting the function P(s) includes:
   (c) filtering the area rate signal $\hat{s}(t)$ using a function that simulates the influence of the machine dynamics at zero return flow; and, as necessary.
   (d) simulating the influence of a return flow ratio $\rho$.

16. A method according to claim 1, characterized in that the function P(s) includes a function R(s) that models the flow of incompletely processed crop, via a return path defined in the harvesting machine, for further processing.

17. A method according to claim 16, characterized in that the function R(s) is substantially non-dynamic.

18. A method according to claim 17, characterized in that it is carried out using a particular algebraic solution of R(s) that is based on a discrete approximation of the proportion of the crop in the harvesting machine that flows via said return path.

19. A method according to claim 1, characterized in that it includes the step of (viii) repeating the method a plurality of times at a sampling frequency of 1 Hz.

20. A method according to claim 1, characterized in that it includes the further steps of:
   (ix) assessing whether variations in the flow of crop through the harvesting machine derive predominantly from time domain variations in the area of the field harvested at time t; and
   (x) carrying out said method if the result of said assessment is affirmative.

21. A method of estimating the instantaneous crop yield in a field during harvesting using a harvesting machine that operates by cutting and/or collecting the crop and has a crop mass flow sensor that measures the mass flow rate $\dot{m}_{out}(t)$ of crop passing through the harvesting machine and generates a signal $\hat{\dot{m}}_{out}(t)$ indicative thereof, the method including the steps of:
   (xi) assessing whether variations in the flow of crop through the harvesting machine derive predominantly from time domain variations in the field conditions; and
   (xii) if the result of said assessment is affirmative, generating a said mass flow rate signal $\hat{\dot{m}}_{out}(s)$ using said sensor, filtering said signal using a function $P^{-1}(s)$ that models the inverse dynamics of the flow of crop through the harvesting machine and additionally filtering said signal using a function F(s) that is a low pass filter to generate an estimate $\hat{y}_1(t)$ of the instantaneous crop yield at time t.

22. A method according to claim 21, characterized in that $\hat{y}_1(t)$ is determined by the expression:

$$\hat{y}_1(t) = \frac{L^{-1}(P^{-1}(s)F(s)\hat{m}_{out}(s))}{\hat{s}(t)}$$

wherein $\hat{s}(t)$ is the measured field surface harvested at instant t.

23. A method according to claim 21, characterized in that the cut-off frequency of the low pass filter F(s) is 0.2 Hz.

24. A method according to claim 21, wherein if the result of said assessment is negative then the method includes the further step of shifting the resulting estimated yield value $\hat{y}_2(t)$ by a time interval $\Delta t$ representative of a delay between cutting and/or collecting of the crop by the harvesting machine and measurement of the mass flow rate by the crop mass flow sensor.

25. A harvesting machine that operates by cutting and/or collecting crop and has a crop mass flow sensor that measures the mass flow rate of crop processed by the machine at a location remote from that at which the harvesting machine cuts and/or collects the crop, wherein a computer is programmed to carry out a method comprising the steps of:
  (i) generating a said mass flow rate signal $\hat{m}_{out}(t)$ using said mass flow sensor; and
  (ii) generating an area rate signal $\hat{s}(t)$ indicative of time domain variations in the area of the field harvested per time unit;
  characterized in that it comprises the further steps of:
  (iii) filtering said area rate signal $\hat{s}(t)$ using a function P(s) representative of the dynamics of the harvesting machine to generate a filtered area rate signal $\hat{s}_2(t)$; and
  (iv) using said filtered area rate signal $\hat{s}_2(t)$ for deriving from said mass flow rate signal $\hat{m}_{out}(t)$ a yield per area unit $\hat{y}_2(t)$.

26. A harvesting machine that operates by cutting and/or collecting the crop and has a crop mass flow sensor that measures the mass flow rate of crop processed by the machine at a location remote from that at which the harvesting machine cuts the crop, wherein a computer is programmed to carry out a method including the steps of:
  (i) assessing whether variations in the flow of crop through the harvesting machine derive predominantly from time domain variations in the field conditions; and
  (ii) if the result of said assessment is affirmative, generating a said mass flow rate signal $\hat{m}_{out}(s)$ using said sensor, filtering said signal using a function $P^{-1}(s)$ that models the inverse dynamics of the flow of crop through the harvesting machine and additionally filtering said signal using a function F(s) that is a low pass filter to generate an estimate $\hat{y}_1(t)$ of the instantaneous crop yield at time.

27. A method according to claim 21, characterized in that if the result of said assessment is negative, that the method further comprises:
  (i) generating a said mass flow rate signal $\hat{m}_{out}(t)$ using said mass flow sensor; and
  (ii) generating an area rate signal $\hat{s}(t)$ indicative of time domain variations in the area of the field harvested per time unit;
  characterized in that it comprises the further steps of:
  (iii) filtering said area rate signal $\hat{s}(t)$ using a function P(s) representative of the dynamics of the harvesting machine to generate a filtered area rate signal $\hat{s}_2(t)$; and
  (iv) using said filtered area rate signal $\hat{s}_2(t)$ for deriving from said mass flow rate signal $\hat{m}_{out}(t)$ a yield per area unit $\hat{y}_2(t)$.

* * * * *